US008094574B2

(12) United States Patent
Katzir

(10) Patent No.: US 8,094,574 B2
(45) Date of Patent: Jan. 10, 2012

(54) METHOD AND APPARATUS FOR WIRELESS RECEIVING

(75) Inventor: Gil Katzir, Herzliya (IL)

(73) Assignee: Marvell International Ltd., Hamilton (BM)

(*) Notice: Subject to any disclaimer, the term of this patent is extended or adjusted under 35 U.S.C. 154(b) by 726 days.

(21) Appl. No.: 12/195,090

(22) Filed: Aug. 20, 2008

(65) Prior Publication Data

US 2009/0054087 A1   Feb. 26, 2009

Related U.S. Application Data

(60) Provisional application No. 60/965,413, filed on Aug. 20, 2007.

(51) Int. Cl.
*H04L 12/28* (2006.01)

(52) U.S. Cl. .................. 370/252; 370/329; 455/458

(58) Field of Classification Search .......... 370/252, 370/311, 328, 329; 375/260, 295; 455/234, 455/450, 458, 522
See application file for complete search history.

(56) References Cited

U.S. PATENT DOCUMENTS

| 6,289,228 | B1 | 9/2001 | Rotstein et al. | |
| 6,650,694 | B1* | 11/2003 | Brown et al. | 375/150 |
| 2005/0084036 | A1* | 4/2005 | Luo et al. | 375/316 |
| 2005/0181731 | A1* | 8/2005 | Asghar et al. | 455/63.1 |
| 2007/0076791 | A1* | 4/2007 | DiFazio et al. | 375/229 |
| 2007/0098051 | A1* | 5/2007 | Shesha et al. | 375/148 |
| 2007/0242641 | A1* | 10/2007 | Ryu et al. | 370/335 |
| 2008/0212654 | A1* | 9/2008 | Nilsson et al. | 375/147 |
| 2009/0190645 | A1* | 7/2009 | Li et al. | 375/229 |

FOREIGN PATENT DOCUMENTS

| WO | WO 00/22748 A1 | 4/2000 |
| WO | WO 03/024146 A1 | 3/2003 |

* cited by examiner

*Primary Examiner* — Jung Park

(57) ABSTRACT

Aspects of the disclosure provide a wireless user equipment that can receive and demodulate a paging indicator with a reduced time duration. Therefore, the wireless user equipment may have a reduced wake-up time. The wireless user equipment can include a receiving module configured to receive signal components including a first signal transmitted over a common pilot channel (CPICH) and a second signal transmitted over a paging indicator channel (PICH) during a time duration. The second signal can include a paging indicator in the time duration. Further, the wireless user equipment can include a processor module configured to select a plurality of correlations in the second signal received during the time duration based on correlations in the first signal received during the time duration, and to extract the paging indicator from the plurality of correlations in the second signal. Additionally, the wireless user equipment can include a controller module configured to control the wireless user equipment according to the paging indicator.

20 Claims, 8 Drawing Sheets

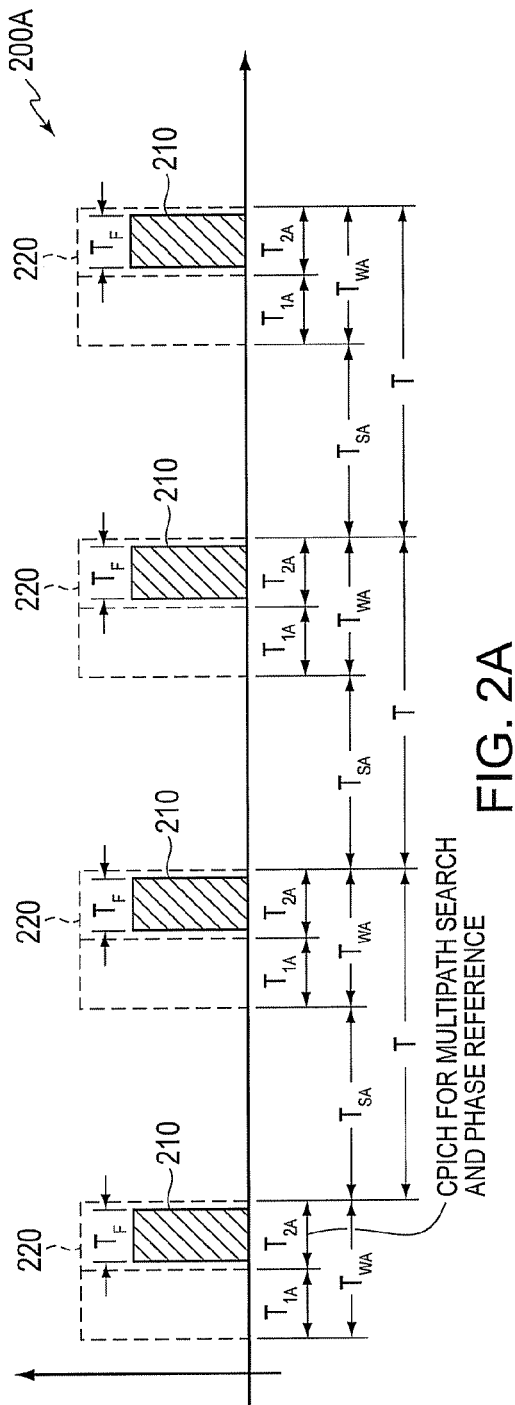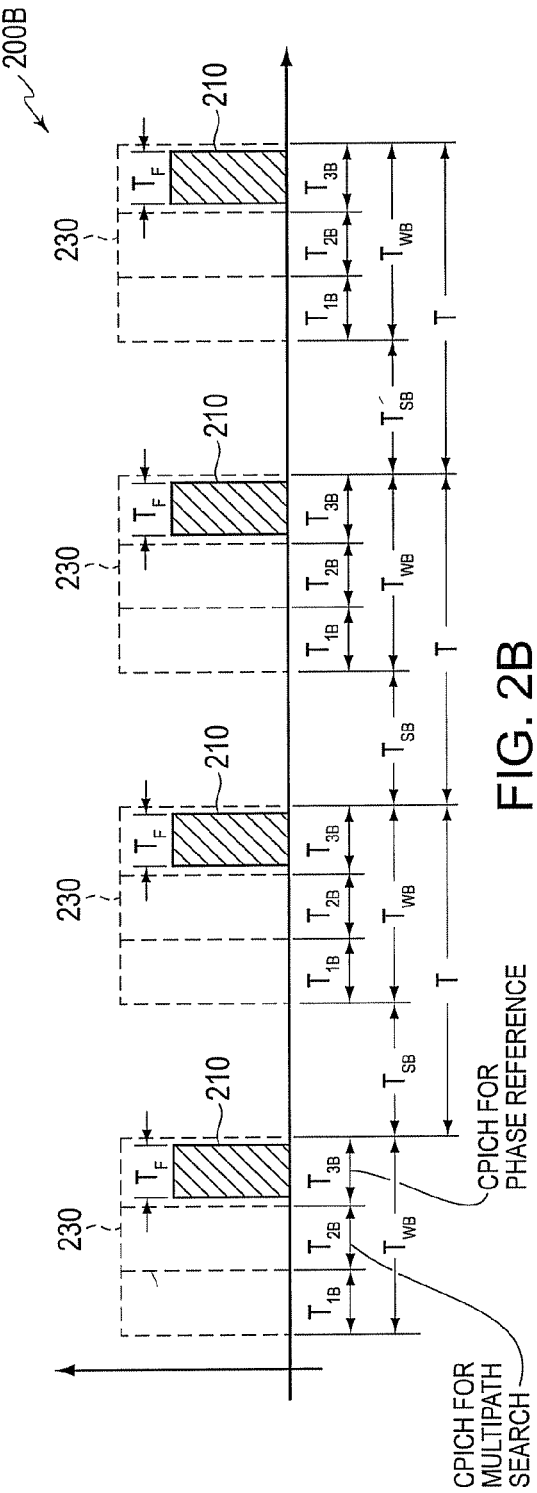

METHOD AND APPARATUS FOR WIRELESS RECEIVING

INCORPORATION BY REFERENCE

This application claims the benefit of U.S. Provisional Application No. 60/965,413, "INCREASING STAND-BY TIME IN WCDMA HANDSETS" filed on Aug. 20, 2007, which is incorporated herein by reference in its entirety.

BACKGROUND

A wireless user equipment, such as a cellular handset, may operate in a sleep mode to save energy. During the sleep mode, the wireless user equipment can de-couple a power supply, such as a battery power supply, to a portion of the wireless user equipment, such as an analog portion, to reduce power usage in order to prolong battery life. However, the wireless user equipment may need to wake up from the sleep mode periodically, and listen to a paging indicator channel. The paging indicator channel may periodically transmit paging indicators to the wireless user equipment. The paging indicators can indicate whether a message is coming to the wireless user equipment. When a paging indicator indicates a coming message, the wireless user equipment may need to prepare for receiving the message. On the other hand, when a paging indicator indicates no coming message, the wireless user equipment can go back to the sleep mode to save energy.

SUMMARY

Aspects of the disclosure can provide a wireless user equipment that can receive a paging indicator with a reduced time duration in order to reduce a wake-up time. The wireless user equipment can include a receiving module configured to receive signal components including a first signal transmitted over a common pilot channel (CPICH) and a second signal transmitted over a paging indicator channel (PICH) during a time duration. The second signal can include a paging indicator in the time duration. Further, the wireless user equipment can include a processor module configured to select a plurality of correlations in the second signal received during the time duration based on correlations in the first signal received during the time duration, and to extract the paging indicator from the plurality of correlations in the second signal. Additionally, the wireless user equipment can include a controller module configured to control the wireless user equipment according to the paging indicator.

According to an aspect of the disclosure, the processor module can be further configured to select a plurality of correlations in the first signal, and select the plurality of correlations in the second signal with a phase reference to the selected correlations in the first signal. Further, the processor module can be configured to determine correlations in the first signal received in the time duration corresponding to a plurality of transmission paths. The processor module can select the plurality of correlations in the second signal received in the time duration corresponding to the determined correlations in the first signal.

According to an aspect of the disclosure, the controller module can be configured to control the wireless user equipment in a sleep mode when the paging indicator indicates no coming message.

Further, the processor module can include a first correlator unit configured to correlate the first signal received during the time duration to a pre-defined code, a second correlator unit configured to correlate the second signal received during the time duration to a channelisation code to de-spread the second signal, a selector unit configured to determine transmission paths based on correlation results from the first correlator unit, and select a number of the correlation results from the second correlator unit based on the determined transmission paths, and a combiner unit configured to combine the selected correlation results from the second correlator unit.

In an example, the selector unit may determine the transmission paths based on a number of maximum correlation results from the first correlator unit. In another example, the selector unit can determine the transmission paths based on a number of correlation results from the first correlator unit that are larger than a threshold. Additionally, the combiner unit may include a rake receiver, and can be configured to phase-offset the selected correlation results from the second correlator unit based on the correlation results from the first correlator unit.

According to an embodiment, the first correlator unit can include a plurality of correlators configured to sequentially correlate portions of the first signal to the pre-defined code. Additionally, the second correlator unit can also include a plurality of correlators configured to sequentially correlate portions of the second signal to the channelisation code. Further, the second correlator unit can be configured to calculate correlations in the second signal received in the entire time duration.

In an example, the processor module may include a buffer unit configured to store digital samples of the first signal and second signal in order to process offline with regard to the receiving module. In another example, at least a portion of the receiving module, such as an analog portion of the receiving module, can be decoupled from a power supply after the time duration.

Aspects of the disclosure can also provide a method for demodulating a paging indicator signal. The method can include receiving signal components including a first signal transmitted over a common pilot channel (CPICH) and a second signal transmitted over a paging indicator channel (PICH) during a time duration. The second signal can include a paging indicator in the time duration. Further, the method can include selecting a plurality of correlations in the second signal that is received during the time duration based on correlations in the first signal received during the time duration, extracting the paging indicator from the selected plurality of correlations in the second signal based on correlations in the first signal, and controlling the wireless user equipment according to the paging indicator.

BRIEF DESCRIPTION OF THE DRAWINGS

Various embodiments of this disclosure that are proposed as examples will be described in detail with reference to the following figures, wherein like numerals reference like elements, and wherein:

FIGS. 2A and 2B show a comparison of timing allocation examples;

DETAILED DESCRIPTION OF EMBODIMENTS

Figure 1:
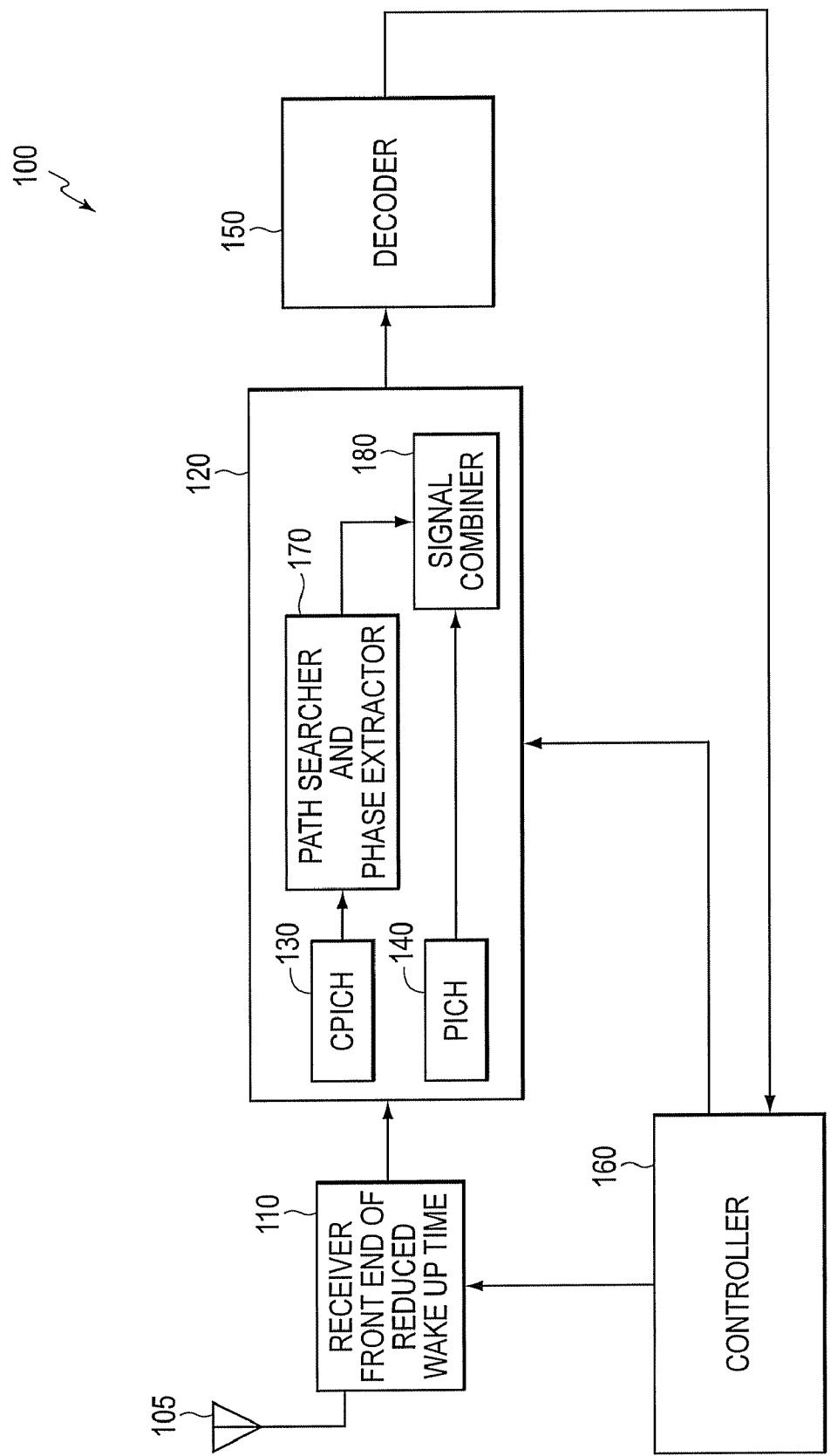
FIG. 1 shows a block diagram of a receiver example of a wireless user equipment according to an embodiment of the disclosure.

FIG. 1 shows a block diagram of a receiver example of a wireless user equipment according to an embodiment of the disclosure. The receiver 100 can include an antenna module 105, a receiver front end module 110, a processor module 120, a decoder module 150, and controller module 160. These elements can be coupled together as shown in FIG. 1, and can enable the receiver 100 to wake up and receive a paging indicator and pilot data in a same time interval. The pilot data can be used to search for multiple paths and can be used as a phase reference to decode the paging indicator. Thus, the wireless user equipment can have a reduced wake-up time duration, and an increased standby time duration to save energy.

The antenna module 105 may receive various signals in the air, such as radio frequency signals transmitted from a base station. The radio frequency signals may carry various information, such as control information, reference information, user data, and the like. The various information may be transmitted over various transmission channels, such as a common pilot channel (CPICH), a paging indicator channel (PICH), and the like, according to a standard or specific applications. For example, the CPICH may transmit a CPICH signal to aid other channels, such as search for multiple transmission paths, provide a phase reference in coherent decoding, and the like. For another example, the PICH may transmit a PICH signal to include paging indicators to inform a group of wireless user equipments of a messaging status. The antenna module 105 can convert the various signals into electrical signals, and provide the electrical signals to the receiver front end 110 for processing. In accordance with an embodiment, the receiver front end 110 has a reduced wake up time.

The receiver front end 110, such as a modem, can receive the electrical signals and can obtain digital samples of the electrical signals. The receiver front end 110 may include various analog circuits, such as amplifier, filter, down-converter, analog-to-digital converter (ADC), and the like, to process the electrical signals. More specifically, the receiver front end 110 may utilize amplifiers to amplify the electrical signals to an appropriate level. Further, the receiver front end 110 may utilize filters to remove noises, and may obtain channel signals with respect to the transmission channels. The receiver front end 110 may utilize one or more down-converters to down-convert the radio frequency signals to base-band signals, for example. Further, the receiver front end 110 may utilize one or more ADCs to obtain digital samples of the processed signals.

The receiver front end 110 may consume a large amount of energy during a receiving time duration due to the reason that analog circuits are generally current driven circuits. In order to save energy, the receiver front end 110 can be configured in a wake-up mode and a sleep mode. When the receiver front end 110 is configured in the wake-up mode, the receiver front end 110 may receive signals from the air. On the other hand, when the receiver front end 110 is configured in the sleep mode, at least a portion of the various analog circuits can be decoupled from a power supply, such as a battery power supply to save energy. For example, the receiver front end 110 may include a controllable switch that can disconnect a current path to a block of the various analog circuits. The controllable switch may be controlled by a signal from the controller 160.

According to an embodiment of the disclosure, the receiver front end 110 can receive and process electrical signals that can include the CPICH signal and the PICH signal in a same time duration, instead of different time durations. The PICH signal may include a paging indicator in the time duration. The paging indicator can be extracted from the PICH signal based on correlations performed on the PICH signal during the time duration. The CPICH signal received during the time duration can be used to search for multiple transmission paths, and can be used as a phase reference to extract the paging indicator from correlations performed on the PICH signal. Thus, the receiver front end 110 may be configured in the wake-up mode for a reduced wake-up time duration to save energy.

The processor module 120 may include various signal processing components that can enable extracting a paging indicator from a PICH signal based on a CPICH signal received in a time duration. For example, the processor module 120 may include a CPICH correlation processing portion 130 and a PICH correlation processing portion 140 that can process digital samples of the CPICH signal and the PICH signal, for example extract correlations, with respect to the transmission channels, respectively.

In an embodiment, the CPICH correlation processing portion 130 and the PICH correlation processing portion 140 can be configured to operate on-line with respect to the receiver front end 110. In other words, the CPICH correlation processing portion 130 and the PICH correlation processing portion 140 may process currently received signals, while the receiver front end 110 continues receiving signals. In addition, the CPICH correlation processing portion 130 and the PICH correlation processing portion 140 can be configured to operate with a correlated timing to process the respective signals. For example, the CPICH correlation processing portion 130 and the PICH correlation processing portion 140 may operate in parallel.

In another embodiment, the CPICH correlation processing portion 130 and the PICH correlation processing portion 140 can be configured to operate off-line with respect to the receiver front end 110. The processor module 120 can be configured to buffer the digital samples of the signals, received from the receiver front end 110. Further, the CPICH correlation processing portion 130 and the PICH correlation processing portion 140 may process the digital samples while the receiver front end 110 can be configured in the sleep mode.

The CPICH correlation processing portion 130 can receive the digital samples and process the digital samples based on a pre-defined code. More specifically, the CPICH correlation processing portion 130 may output correlations of the digital samples and the pre-defined code. The correlations can be used to search for transmission paths and can be used as phase references to extract the paging indicator. For example, the processor module 120 may include a path searcher and phase extractor portion 170 and a signal combiner 180 coupled together with the CPICH correlation processing portion 130 and the PICH correlation processing portion 140 as shown in FIG. 1. The path searcher and phase extractor portion 170 may receive the outputted correlations from the CPICH correlation processing portion 130, and may determine the transmission paths and phase references based on the correlations. Further, the path searcher and the phase extractor 170 may provide transmission paths and the phase references to the signal combiner 180.

The PICH correlation processing portion 140 may receive the digital samples, and de-spread the digital samples based on a spreading code, such as a channelisation code, in order to extract the paging indicator. More specifically, the PICH correlation processing portion 140 may output correlations of the digital samples and the spreading code. The correlations can be combined, for example by the signal combiner 180, based on the transmission paths and the phase references information from the path searcher and phase extractor 170.

Further, the decoder module 150 may decode the de-spreaded PICH signal, and obtain a paging indicator for the wireless user equipment. The paging indicator can be used to determine a next status of the wireless user equipment. For example, the controller 160 may receive the paging indicator, and control elements of the wireless user equipment based on the paging indicator.

During operation, for example, the controller 160 may send signals to the elements of the receiver 100 to configure the receiver 100 in the wake-up mode. For example, the signals may couple a power supply to at least a portion of the receiver 100. The elements of the receiver 100, such as the receiver front end 110, and the like, may take some time to initialize and stabilize to prepare for receiving signals from the air. Then, the antenna module 105 may convert the signals from the air to electrical signals and provide the electrical signals to the receiver front end 110. The receiver front end 110 may obtain digital samples of the received signals during a time duration. The received signals can include components of the PICH signal and the CPICH signal received during a time duration, in which the PICH signal includes a paging indicator to the wireless user equipment. The receiver front end 110 can provide the digital samples to the processor module 120 for processing of correlations. Additionally, the receiver front end 110 can be decoupled from the power supply after the time duration to save energy.

The processor module 120 can receive the digital samples and process the digital samples. In an embodiment, the processor module 120 may process the digital samples on-line with regard to the receiver front end 110. In another embodiment, the processor module 120 may buffer the digital samples and may process the buffered digital samples off-line with regard to the receiver front end 110, for example when the receiver front end 110 is configured in the sleep mode.

The processor module 120 may de-spread the digital samples of the PICH signal corresponding to the time duration and provide the de-spreaded digital samples to the decoder 150. The decoder 150 may decode the de-spreaded digital samples, and obtain the paging indicator. Additionally, the paging indicator can be transmitted to the controller 160. The controller 160 may control the wireless user equipment based on the paging indicator. For example, when the paging indicator indicates a coming message, the controller 160 may send signals to prepare the wireless user equipment to receive the message. On the other hand, when the paging indicator indicates no coming message, the controller 160 may send signals to configure the wireless user equipment to, for example the sleep mode.

FIGS. 2A and 2B show a comparison of timing allocation examples according to the disclosure and a related art, respectively. FIG. 2A shows a timing allocation example 200A according to the disclosure. The timing allocation 200A can include a time duration for receiving and processing both a PICH signal and a CPICH signal. The CPICH signal can be used to search for multiple transmission paths and can be used as a phase reference to the PICH signal. The PICH signal can be processed, for example correlated to a code in the entire time duration.

FIG. 2B shows a timing allocation example 200B according to a related art. The timing allocation 200B can include a time duration for receiving and processing a CPICH signal in order to select multiple transmission paths, and a following time duration for receiving and processing a PICH signal based on the multiple transmission paths selected during the previous time duration.

In both FIGS. 2A and 2B, paging indicators 210 can be transmitted periodically by a base station. The base station may transmit the paging indicators 210 according to a transmitting period T. The transmitting period T may have a length depending on service carriers. For example, the transmitting period T may range from about 80 ms to about 5 seconds depending on the service carriers. Each transmitting period T may include a transmitting frame $T_F$ about 10 ms for transmitting a paging indicator 210. Each paging indicator 210 may use one or more binary bits to inform a messaging status for a plurality of wireless user equipments. For example, binary 0 may inform no coming message, and binary 1 may inform a coming message for a wireless user equipment.

A wireless user equipment may operate in accordance to the transmitting period T and the transmitting frame $T_F$. For example, a wireless equipment may be configured in a wake-up mode with regard to a wake-up time duration and a sleep mode with regard to a standby time duration of the transmitting period. During the wake-up time duration, the wireless user equipment may be able to receive the paging indicators 210. During the standby time duration, the wireless user equipment may decouple a portion, such as a receiver front end, of the wireless user equipment to save energy.

FIG. 2A shows a timing allocation example for a wireless equipment according to an embodiment of the disclosure. During a transmitting period T, the wireless equipment may include a reduced wake-up time duration 220 of $T_{WA}$ and an increased standby time duration of $T_{SA}$. Further, the reduced wake-up time duration 220 may include a first portion $T_{1A}$ and a second portion $T_{2A}$. During the first portion $T_{1A}$, the wireless equipment may wake up from a standby mode and may take some time to initiate and stabilize. During the second portion $T_{2A}$, the wireless user equipment may receive and process a PICH signal that may include a paging indicator 210. Additionally, during the second portion $T_{2A}$, the wireless user equipment may receive and process a CPICH signal. The wireless equipment may extract the paging indicator from the PICH signal received in the second portion $T_{2A}$ using a phase reference based on the CPICH signal that is received in the second portion $T_{2A}$. More specifically, the wireless equipment may determine a plurality of correlations for both the CPICH signal received in the second portion $T_{2A}$ and the PICH signal received in the second portion $T_{2A}$. The plurality of correlations can be used to extract the paging indictor in the PICH signal. More specifically, the plurality of correlations in the CPICH signal can be used to determine multiple transmission paths. In addition, the plurality of correlations in the CPICH signal can provide a phase reference to the plurality of correlations in the PICH signal to extract the paging indicator.

By way of comparison, FIG. 2B shows a timing allocation example for a wireless equipment according to the related art. During a transmitting period T, the wireless equipment may also include a wake-up time duration 230 of $T_{WB}$ and a standby time duration of $T_{SB}$. Further, the wake-up time duration 230 may include a first portion $T_{1B}$, a second portion $T_{2B}$ and a third portion $T_{3B}$. During the first portion $T_{1B}$, the wireless equipment may wake up from a standby mode, and may take some time to initiate and stabilize. During the second portion $T_{2B}$, the wireless user equipment may process a CPICH signal only and determine a plurality of transmission paths based on the CPICH signal received and processed in the second portion $T_{2B}$. For example, the plurality of transmission paths may correspond to a number of maximum correlations. Thus, the wireless equipment may be configured according to the transmission paths of the maximum correlations, for example by finger assignments. During the third portion $T_{3B}$, the wireless user equipment can receive and process a PICH signal according to finger assignments based on the transmission paths. The PICH signal may include a paging indicator 210. The paging indicator 210 can be extracted with reference to finger assignments based on the CPICH signal processed previously.

It is noted that the example in FIG. 2 performing correlations on both CPICH and PICH may require additional digital processing capacity, however this digital processing capacity generally requires less power in comparison to waking up the receiver front end 110 for a longer period.

As can be seen, in the example seen in FIG. 2A, which corresponds to timing in accordance with an embodiment of the disclosure, a paging indicator based on the PICH signal and the CPICH signal can be received and processed in the same time duration, such as $T_{2A}$. However, the example in FIG. 2B which corresponds to a conventional timing allocation, a paging indicator in the PICH signal is received and process in a time duration $T_{3B}$, and the CPICH signal received and processed in another time duration, such as $T_{2B}$, additionally. Therefore, as seen in FIG. 2A in accordance with an embodiment of the disclosure, a reduced wake-up time duration 220 and an increased standby time duration can be exhibited in comparison with conventional receipt and processing of PICH and CPICH signals as seen in FIG. 2B.

Figure 3:
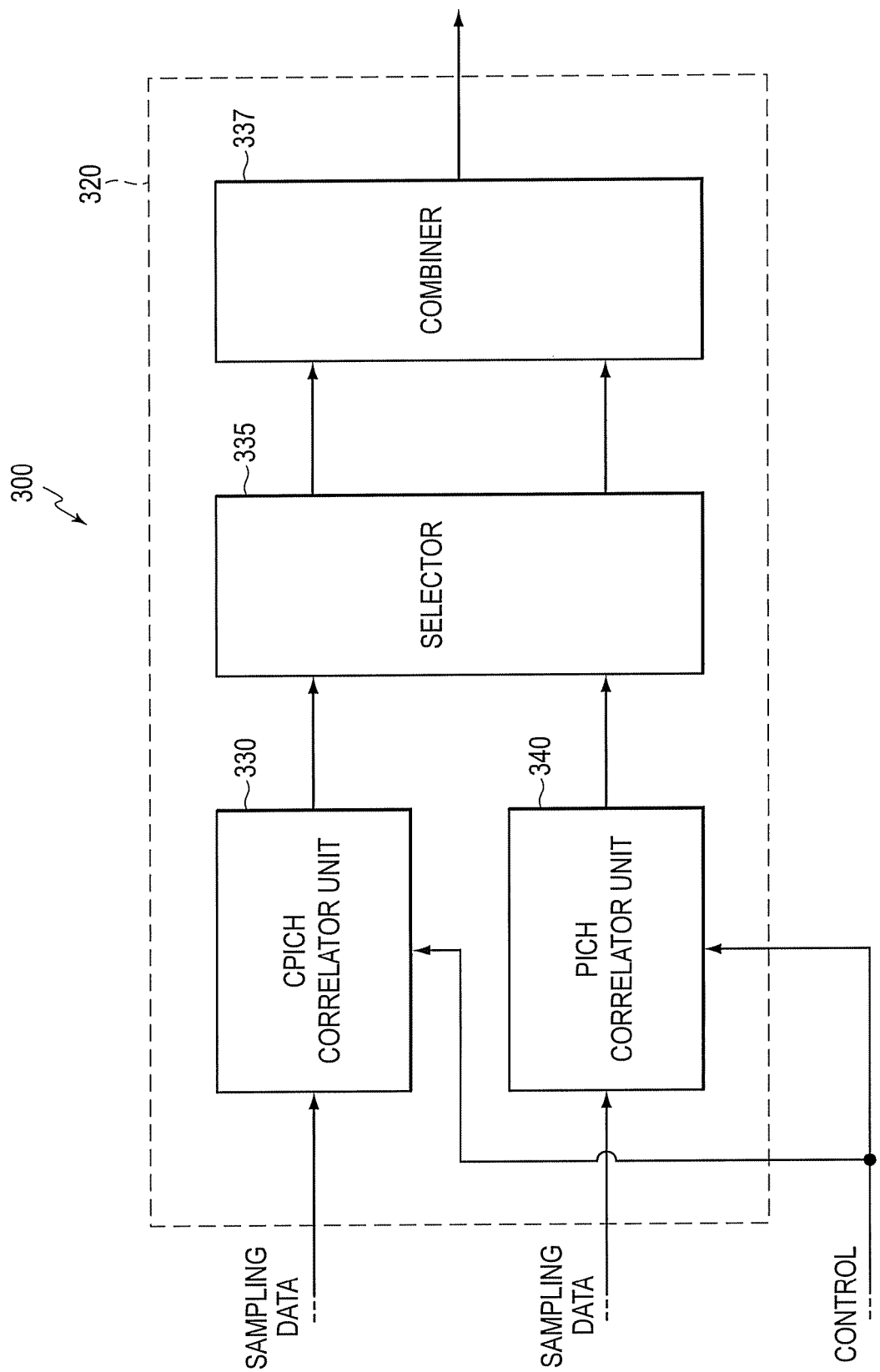
FIG. 3 shows a block diagram of a processor module example enabling a reduced wake-up time.

FIG. 3 shows a block diagram of a processor module example that can enable a wireless user equipment example to operate according to an embodiment of the disclosure. The processor module 320 can include a CPICH correlator unit 330, a PICH correlator unit 340, a selector unit 335, and a combiner unit 337. These elements can be coupled as shown in FIG. 3.

The CPICH correlator unit 330 may correlate digital samples received during time duration $T_{2A}$ (FIG. 2A) with a pre-defined code of the CPICH, and provide results to the selector unit 335. The PICH correlator unit 340 may correlate digital samples received during time duration $T_{2A}$, with a code, such as a channelisation code of the PICH, and provide results to the selector unit 335. The CPICH correlator unit 330 and the PICH correlator unit 340 can be configured to operate in a timing correlated manner, such as in parallel.

The selector unit 335 can receive the correlation results from both the CPICH correlator unit 330 and the PICH correlator unit 340. More specifically, the selector unit 335 may select transmission paths based on the correlation results of the CPICH correlator unit. Further, the selector unit 335 may select the results of the PICH correlator unit 340 based on the selection results of the CPICH correlator unit 330. For example, the selector unit 335 may select N transmission paths corresponding to the N maximum correlation results. For another example, the selector unit 335 may select transmission paths corresponding to the correlation results that are larger than a threshold. Additionally, the selector unit 335 may select from among the results of the PICH correlator unit 330 correlations that correspond to the selected transmission paths that may be related to selected CPICH correlations by a phase reference. Subsequently, the selector unit 335 can provide the selected results of the PICH correlator unit 330 to the combiner unit 337.

The combiner unit 337 can receive the selected results of the PICH correlator unit 340, and may combine the results according to the corresponding transmission paths. The combined results can be provided to a decoder module for extracting a paging indicator. In an embodiment, the combiner unit 337 may be configured as a rake receiver. The rake receiver may include a plurality of fingers. The plurality of fingers can be configured according to the selected transmission paths based on the results of the CPICH correlator unit 330. For example, phase offsets of the plurality of fingers can be configured according to phases of the selected correlation results of the CPICH correlator unit 340. Further, the plurality of fingers can adjust the selected results of the PICH correlator unit 340, such as phase offsets, based on the respective configurations, and combine the selected results together.

Figure 4A:
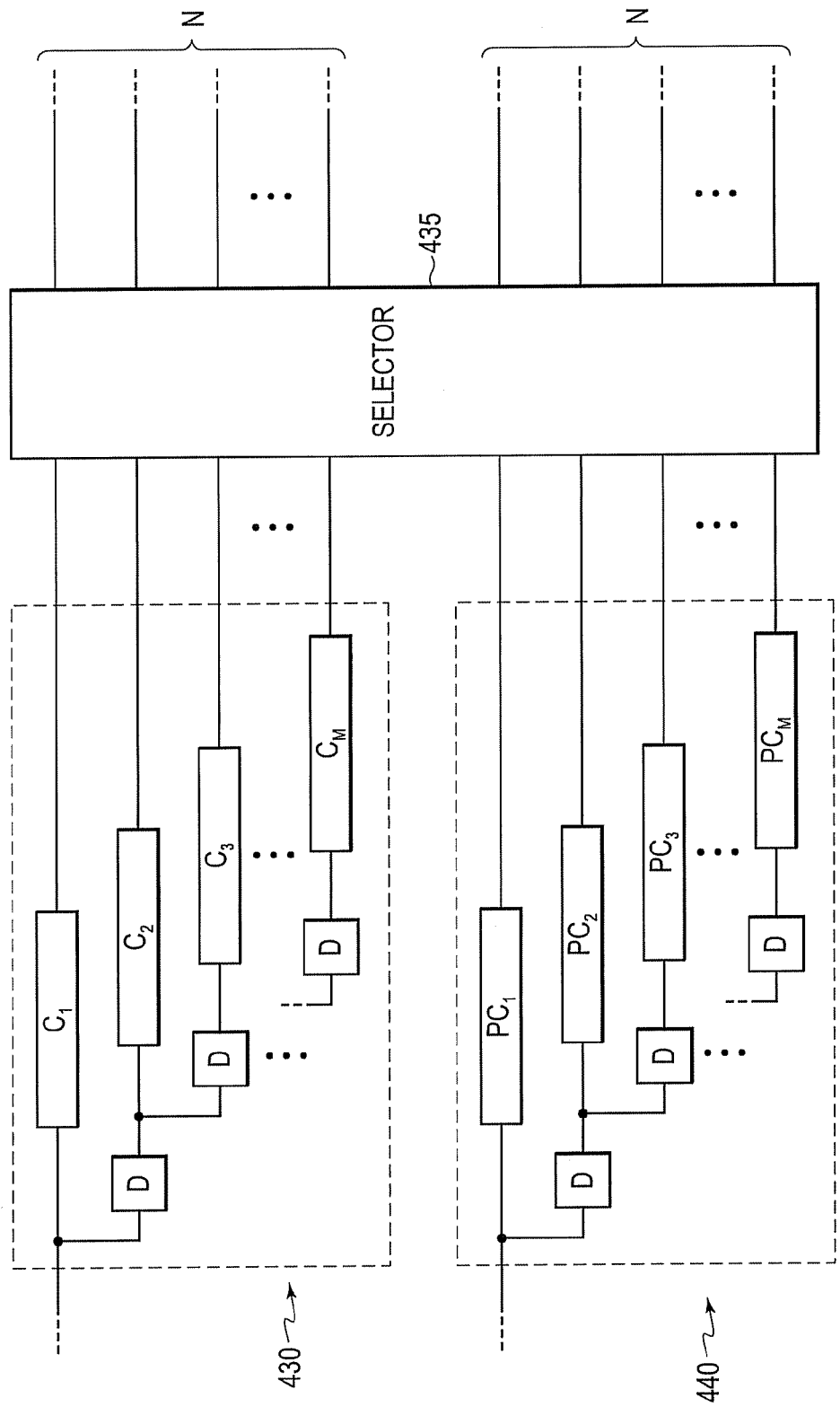
FIGS. 4A and 4B show an example of correlator units enabling online processing.
Figure 4B:
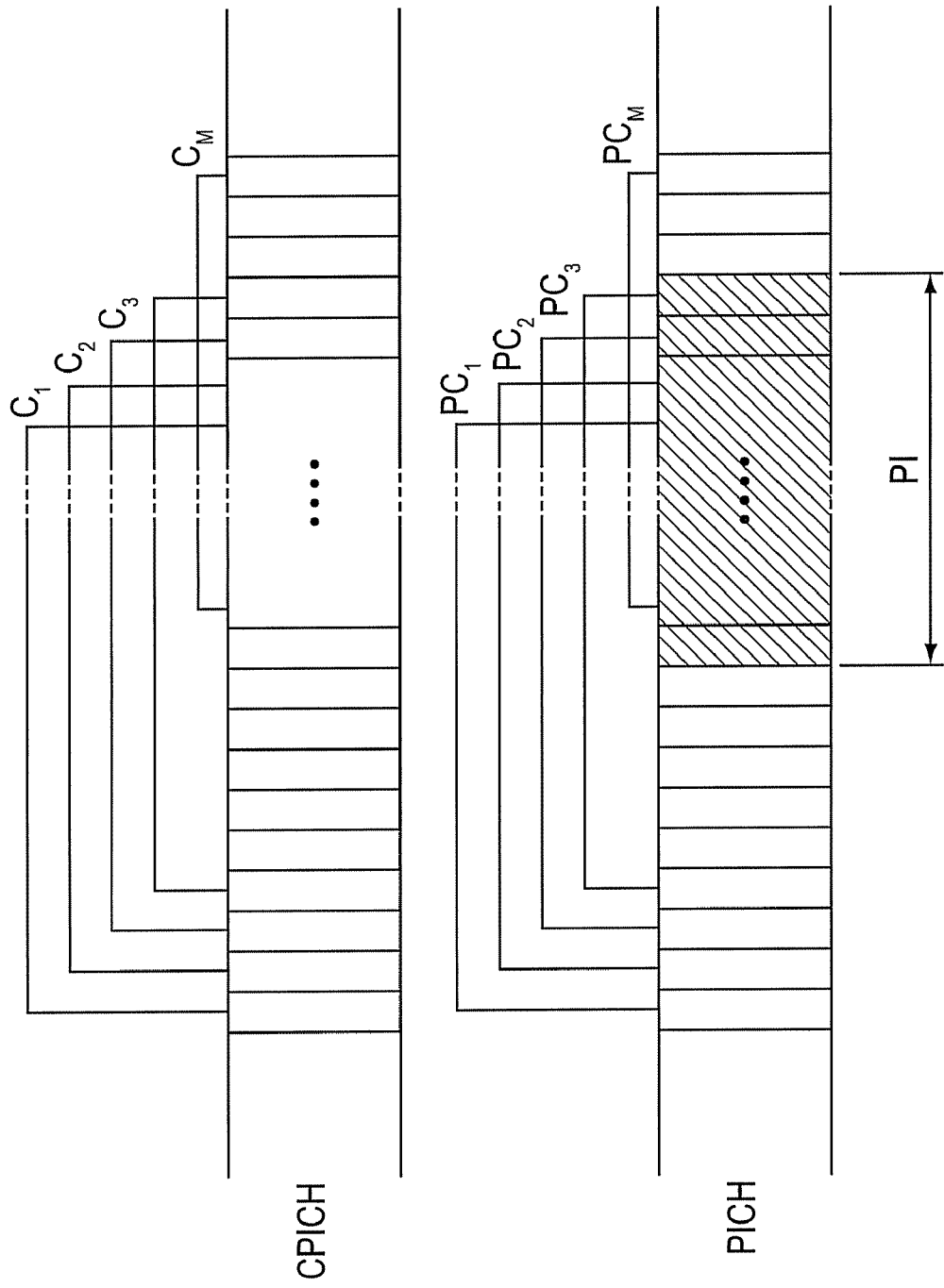

FIG. 4A shows a block diagram of a CPICH correlator unit example 430 and a PICH correlator unit example 440 coupled together. FIG. 4B shows an operational example using the CPICH correlator unit 430 and the PICH correlator unit 440 according to an embodiment of the disclosure.

The CPICH correlator unit 430 may include a correlator bank, which may further include a plurality of correlators, such as $C_1$-$C_M$, arranged in a sequence. A correlator in the sequence may include a delay D corresponding to a previous correlator.

Similarly, the PICH correlator unit 440 may include a correlator bank, which may further include a plurality of correlators, such as $PC_1$-$PC_M$, arranged in a sequence. A correlator in the sequence may include the delay D corresponding to a previous correlator.

The CPICH correlator unit 430 and the PICH correlator unit 440 may operate in a timing correlated manner. In an embodiment, the CPICH correlator unit 430 and the PICH correlator unit 440 may operate in parallel to provide a plurality of PICH correlations and CPICH correlations to selector 435.

It is noted that in an embodiment, PICH correlations are made without reference to selected CPICH correlations and that coordination between PICH and CPICH correlations are make downstream during selection of the plurality of correlations.

FIG. 4B shows a parallel operational example. In the example, a wireless user equipment may receive signals including a CPICH signal component and a PICH signal component. The received signals can be sampled and digitalized by a receiver front end, such as the receiver front end 110 in the receiver 100, of the wireless user equipment. The digital samples can be received and processed by the CPICH correlator unit 430 and the PICH correlator unit 440. More specifically, the correlator $C_1$ of the CPICH correlator unit 430 may calculate a correlation using a sequence of the digital samples and a pre-defined CPICH code, and the correlator $PC_1$ of the PICH correlator unit 440 may calculate a correlation using a sequence of the digital samples and a PICH channelisation code correspondingly. The sequence of digital samples using by the PICH correlator unit 440 and the sequence of the digital samples using by the CPICH correlator unit 430 can be time correlated, such as received in a same time slot. Similarly, the correlator $C_2$ and the correlator $PC_2$ may operate in the same manner, and so on and so forth.

Figure 5A:
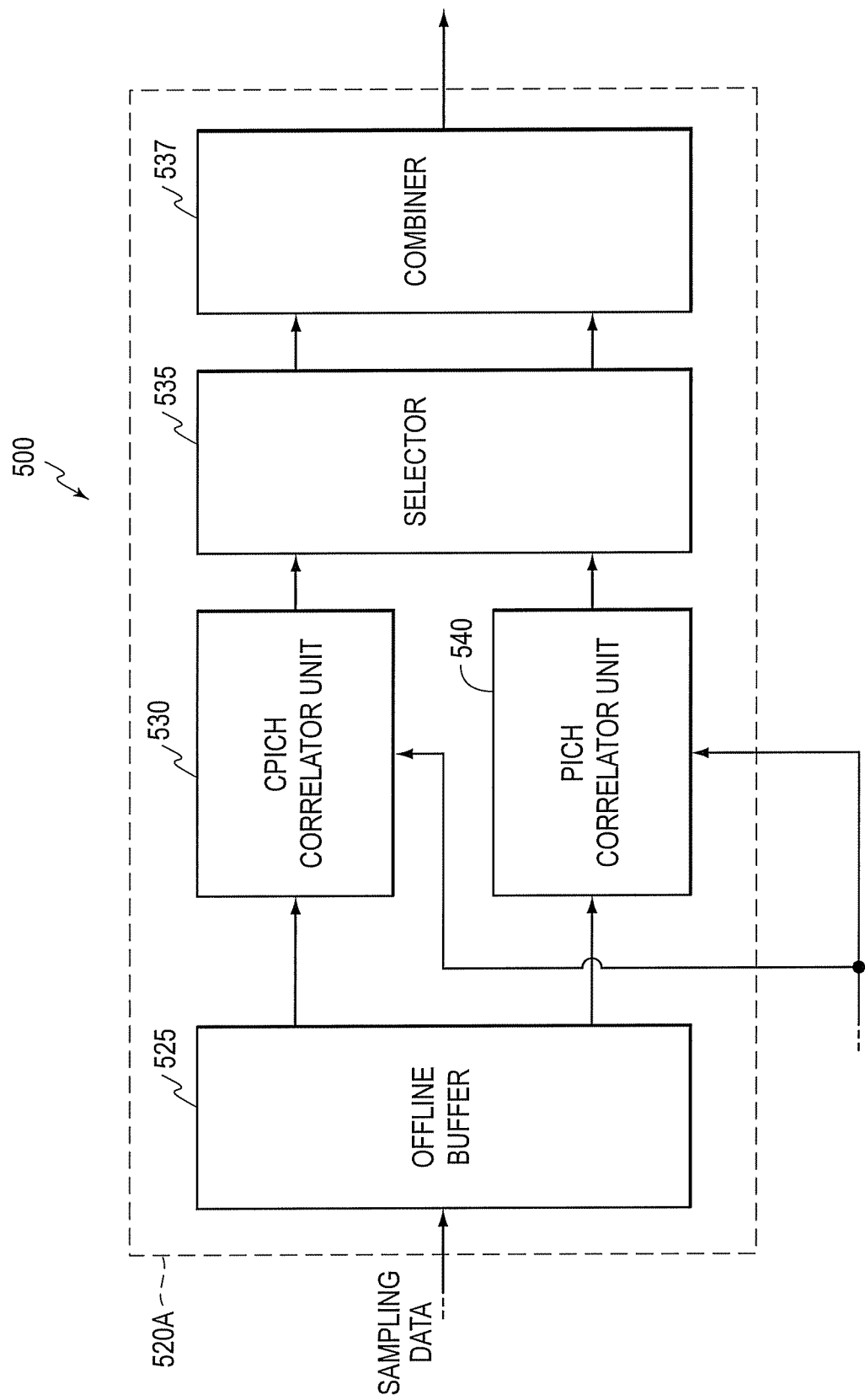
FIGS. 5A and 5B show block diagrams of other processor module examples enabling offline processing.
Figure 5B:
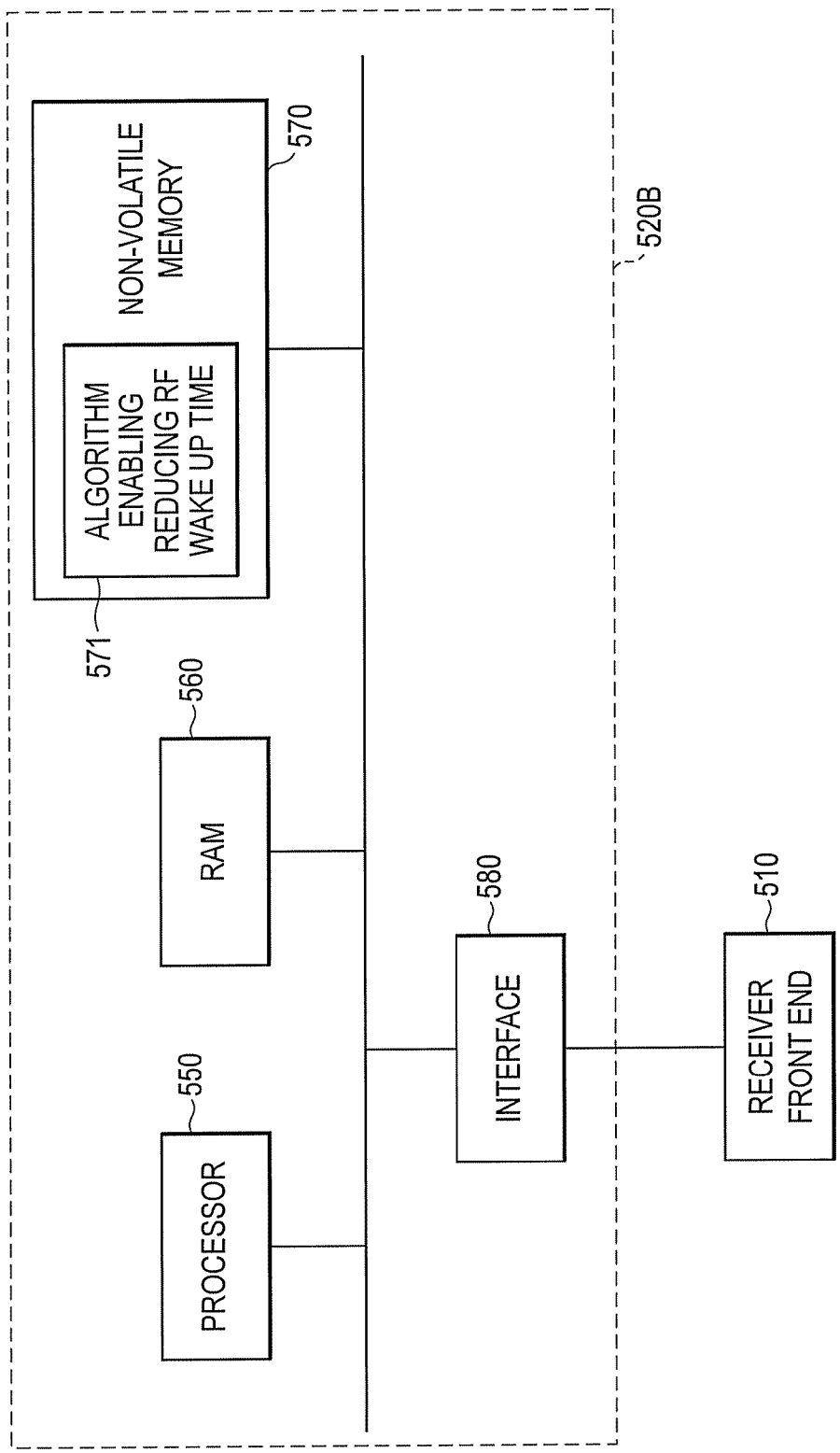

FIGS. 5A and 5B show block diagrams of other processor module examples 520A and 520B that may operate off-line with regard to a receiver front end according to an embodiment of the disclosure. The processor module 520A may include an offline buffer 525, a CPICH correlator unit 530, a PICH correlator unit 540, a selector 535, and a combiner 537. These elements can be coupled as shown in FIG. 5A.

The offline buffer 525 can be coupled with a receiver front end, such as the receiver front end 110 in the receiver 100, and buffer digital samples, such as digital samples of signals including a CPICH signal and a PICH signal, from the receiver front end. The receiver front end can be configured in a wake-up mode, and may receive signals for a time duration. During the time duration, the PICH signal may include a paging indicator. The received signals can be processed by the receiver front end, and the digital samples of the received signal can be buffered in the offline buffer 525. Further, the receiver front end can be configured to periodically enter a sleep mode to save energy. Additionally, the buffered digital samples can be processed by the processor module 520A to extract the paging indicator.

The CPICH correlator unit 530 may calculate correlations using digital samples including the CPICH signal that are buffered in the offline buffer 525. The PICH correlator unit 540 may calculate correlations using digital samples including the PICH signal that are buffered in the offline buffer 525.

The selector unit 535 can receive the correlation results from both the CPICH correlator unit 530 and the PICH correlator unit 540. More specifically, the selector unit 535 may select a plurality results outputted from the CPICH correlator unit 530. Further, the selector unit 535 may select from among the plurality of correlation results of the PICH correlator unit 540 based on selected results of the CPICH correlator unit 530. For example, the selector unit 535 may select a plurality of maximum correlation results from the CPICH correlator unit 530. For another example, the selector unit 535 may select a plurality of correlation results from the CPICH correlator unit 530 that are larger than a threshold. Further, the selector unit 535 may select correlations from among the plurality of the results from the PICH correlation unit 540 that correspond to the plurality of the correlation results from the CPICH correlation unit 530 based on a phase relationship. In other words, PICH correlations are selected from among the PICH correlations based on a phase relationship to selected CPICH correlations.

The combiner 537 may combine the plurality of selection results from the PICH correlator unit 540. More specifically, the combiner 537 may adjust phases of the plurality of correlation results from the PICH correlator unit 540 based on the correlation results from the corresponding CPICH correlator unit 530. In an embodiment, the combiner 537 can be configured as a rake receiver.

In an embodiment, the processor module can be implemented using application specific integrated circuits (ASICs). In another embodiment, the processor module can be implemented as a general processor running software programs.

FIG. 5B shows a block diagram of another processor module example that may use a processor running software programs. The processor module 520B may include a processor unit 550, such as a general processor, a random access memory (RAM) unit 560, a non-volatile memory 570, and an interface unit 580. These elements can be coupled as shown in FIG. 5B.

The processor unit 550 can execute system and application programs. The non-volatile memory 570 can hold information even when power is off. Therefore, the non-volatile memory 570 can be used to store system and application programs, such as firmware. The system and application programs may include a correlation function, a selection function, a combining function, and the like. Additionally, the system and application programs may include an algorithm 571 that may determine correlations from a PICH signal and from a CPICH signal that are received in a same time duration, using the correlation function. Algorithm 571 may further apply a selection function to select PICH correlations that correspond to selected CPICH correlations, and a combining function to combine the selected PICH correlations. Therefore, the algorithm 571 can enable a reduced radio frequency circuit (RF) wake-up time by determining both CPICH and PICH correlations for an entire time duration at the substantially same time.

The RAM unit 560 is readable and writable. Generally, the RAM unit 560 can have a fast access speed. It can be preferred that data and codes of software programs are stored in the RAM unit 560 during operation, such that the processor unit 550 can access the RAM unit 560 for the codes and data instead of the non-volatile memory 570. The interface unit 580 may couple the processor module 520B to a receiver front end 510.

During operation, the receiver front end 510 may receive signals and obtain digital samples of the signals. The digital samples can be transmitted to the processor module 520B via the interface unit 580. The digital samples can be stored in the RAM unit 560 and can be processed by the processor unit 550. The processor unit 550 may execute software programs, such as the algorithm 571 that can enable the reduced RF wake-up time, which may be stored in the non-volatile memory 570. For example, the processor unit 550 may execute a correlation function to calculate correlations using the digital samples. Further, the processor unit 550 may execute a selection function to select the correlation results. Subsequently, the processor unit 550 may execute a combining function to combine the selected correlation results.

Figure 6:
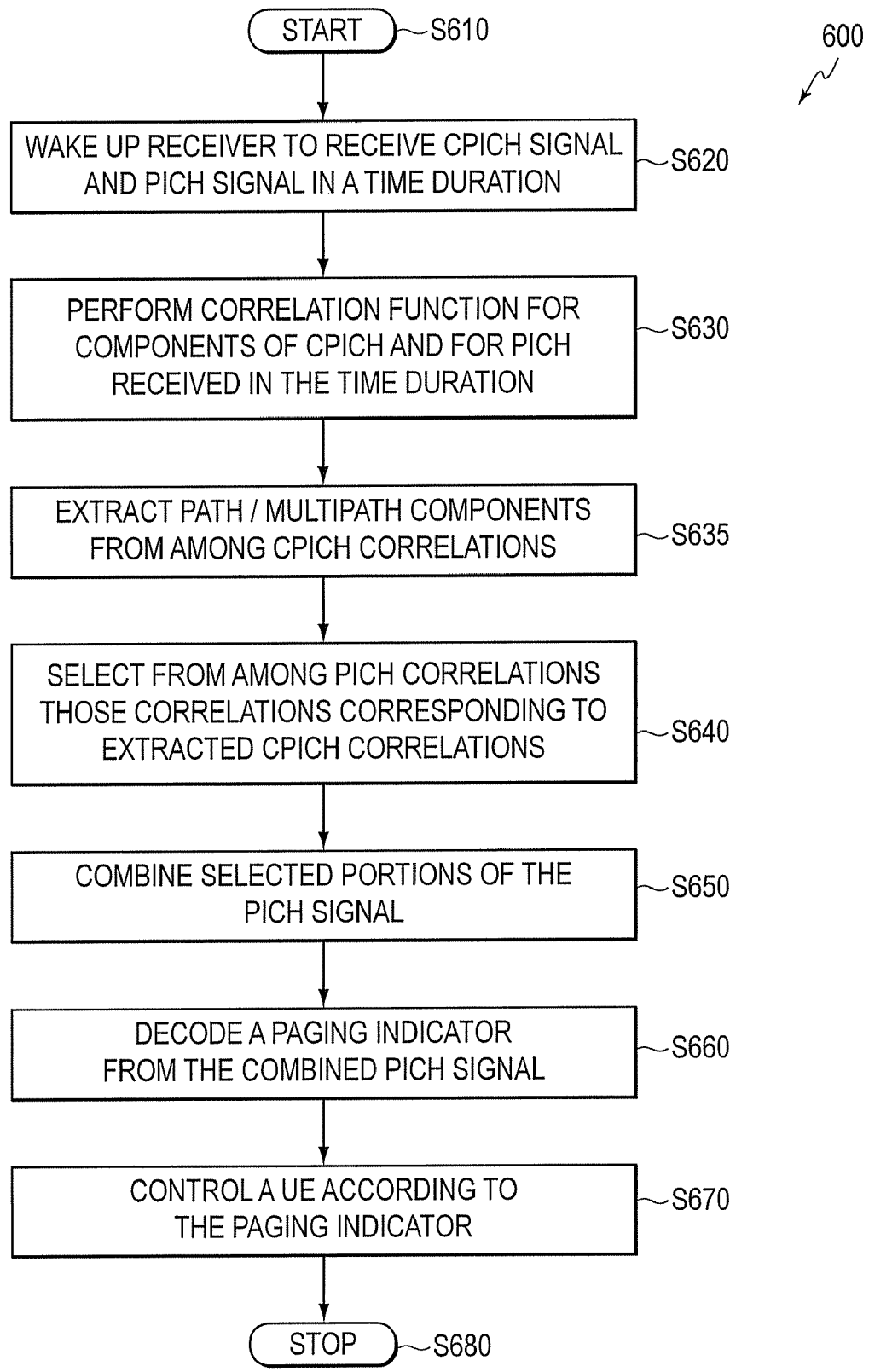
FIG. 6 shows a flowchart outlining a process for obtaining a page indicator with a reduced wake-up time duration.

FIG. 6 shows a flowchart outlining a process for obtaining a page indicator with a reduced wake-up time duration. The process starts at step S610, and proceeds to step S620.

In step S620, a receiver of a user equipment, which may include a receiver front end, may wake up to receive signals including a CPICH signal component and a PICH signal component in a time duration. The PICH signal may include a paging indicator in the time duration. In an example, the receiver front end may be configured into an energy saving mode after the time duration. According to an aspect of the disclosure, the receiver front end can operate on-line with subsequent receiver components, such as in FIG. 3. According to another aspect of the disclosure, the receiver front end may operate off-line with subsequent receiver components, such as via an offline buffer as shown in FIG. 5A. The process then proceeds to step S630.

In step S630, the receiver may perform correlation function for components of the CPICH signal and the PICH signal received in the time duration. For example, the receiver may calculate correlations of received digital samples to a predefined sequence to obtain the CPICH components, and may calculate correlations of received digital samples to a channelisation code to obtain the PICH components. The process then proceeds to step S635.

In step 635, the receiver may extract multiple transmission path components from among CPICH correlations. In an example, the receiver may select a number of maximum CPICH correlations. In another example, the receiver may select a number of CPICH correlations that are larger than a threshold. Then, the process proceeds to step S640.

In step S640, the receiver may select the PICH correlations corresponding to the selected CPICH correlations. In an example, the receiver may select the PICH correlations based on a phase reference to the selected CPICH correlations. Then, the process proceeds to step S650.

In step S650, the receiver may combine the selected PICH correlations. More specifically, the receiver may combine the selected PICH correlations according to phases of the selected of the CPICH correlations. In an embodiment, the receiver may include a rake receiver, which may adjust phases of the selected PICH correlations based on corresponding CPICH correlations respectively, and sum up the adjusted PICH correlations. Then, the process proceeds to step S660.

In step S660, the combined PICH correlations can be used to decode the paging indicator to the user equipment. The paging indicator may indicate a messaging status to the user equipment. The process then proceeds to step S670.

In step S670, a controller of the user equipment may control the user equipment according to the paging indicator. For example, when the paging indicator indicates a coming message, the controller may configure the user equipment to prepare for receiving the coming message. When the paging indicator indicates no coming message, the controller may configure the user equipment in an energy saving mode, for example a sleep mode. Then, the process proceeds to step S680 and terminates.

It is noted that, according to another aspect of the disclosure, the receiver may extract the paging indicator offline with receipt of signals including the paging indicator. In an example, the receiver may include a receiver front end, which may wake up periodically to receive signals including the paging indicator. The receiver front end may be configured in a sleep mode after receipt of the signals to save energy. The received signals can be sampled and digitalized. The digital samples of the received signals can be buffed in a memory medium. Further, the digital samples can be processed according to the disclosure to extract the paging indicator.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A wireless user equipment, comprising:
a receiving module configured to receive signal components including a first signal transmitted over a common pilot channel (CPICH) and a second signal transmitted over a paging indicator channel (PICH) during a time duration, wherein the second signal comprises a paging indicator in the time duration;
a processor module including:
a first correlator unit configured to correlate the first signal received during the time duration to a pre-defined code;
a second correlator unit configured to correlate the second signal received during the time duration to a channelisation code to de-spread the second signal;
a selector unit configured to determine transmission paths based on correlation results from the first correlator unit, and select a number of the correlation results from the second correlator unit corresponding to the transmission paths; and
a combiner unit configured to combine the selected correlation results from the second correlator unit; wherein the processor module is configured to extract the paging indicator from the combined correlation results; and
a controller module configured to control the wireless user equipment according to the paging indicator.

2. The wireless user equipment according to claim 1, wherein the selector unit is further configured to select a plurality of correlation results from the first correlator unit, and select the number of correlation results from the second correlator unit with a phase reference to the selected correlation results from the first correlator unit.

3. The wireless user equipment according to claim 1, wherein the controller module is further configured to control the wireless user equipment in a sleep mode when the paging indicator indicates no coming message.

4. The wireless user equipment according to claim 1, wherein the selector unit determines the transmission paths based on a number of maximum correlation results from the first correlator unit.

5. The wireless user equipment according to claim 1, wherein the selector unit determines the transmission paths based on a number of correlation results from the first correlator unit that are larger than a threshold.

6. The wireless user equipment according to claim 1, wherein the combiner unit further comprises a rake receiver.

7. The wireless user equipment according to claim 1, wherein the combiner unit is further configured to phase-offset the selected correlation results from the second correlator unit based on the correlation results from the first correlator unit.

8. The wireless user equipment according to claim 1, wherein the first correlator unit further comprises:
a plurality of correlators configured to sequentially correlate a portion of the first signal to the pre-defined code.

9. The wireless user equipment according to claim 1, wherein the second correlator unit further comprises:
a plurality of correlators configured to sequentially correlate a portion of the second signal to the channelisation code.

10. The wireless user equipment according to claim 1, wherein the second correlator unit is further configured to calculate correlations in the second signal received in the entire time duration.

11. The wireless user equipment according to claim 1, wherein the processor module further comprises:
a buffer unit configured to store digital samples of received signal components in order to process offline with regard to the receiving module.

12. The wireless user equipment according to claim 1, wherein at least a portion of the receiving module is decoupled from a power supply after the time duration.

13. A method for demodulating a paging indicator signal, comprising:
receiving signal components including a first signal transmitted over a common pilot channel (CPICH) and a second signal transmitted over a paging indicator channel (PICH) during a time duration, wherein the second signal comprises a paging indicator in the time duration;
correlating the first signal to a pre-defined code by a first correlator unit;
correlating the second signal to a channelization code by a second correlator unit to de-spread the second signal;
determining transmission paths based on correlation results from the first correlator unit;
selecting a plurality of correlation results from the second correlator unit based on the determined transmission paths;
combining the selected correlation results from the second correlator unit;
extracting the paging indicator from the combined correlation results; and
controlling the wireless user equipment according to the paging indicator.

14. The method according to claim 13, wherein selecting the plurality of correlation results from the second correlator unit further comprises:
selecting a plurality of correlation results from the first correlator unit; and selecting the plurality of correlation results from the second correlator unit with a phase reference to the selected correlation results from the first correlator unit.

15. The method according to claim 14, wherein the plurality of correlation results from the first correlator unit correspond to correlation values larger than a threshold.

16. The method according to claim 14, wherein the plurality of correlation results from the first correlator unit correspond to a number of maximum correlation values.

17. The method according to claim 13, further comprising:
combining the plurality of correlation results from the second correlator unit with phase offsets corresponding to the transmission paths.

18. The method according to claim 14, further comprising:
compensating a phase of a correlation result from the second correlator unit according to a phase of a corresponding correlation result from the first correlator unit.

19. The method according to claim 13, further comprising:
digitalizing the signal components received in the time duration to obtain digital samples; and
buffering the digital samples.

20. The method according to claim 13, further comprising:
de-coupling a receiving portion from a power supply after the time duration.

* * * * *